No. 760,689. PATENTED MAY 24, 1904.
J. G. HALL.
WATER HEATER.
APPLICATION FILED JAN. 14, 1903.
NO MODEL.
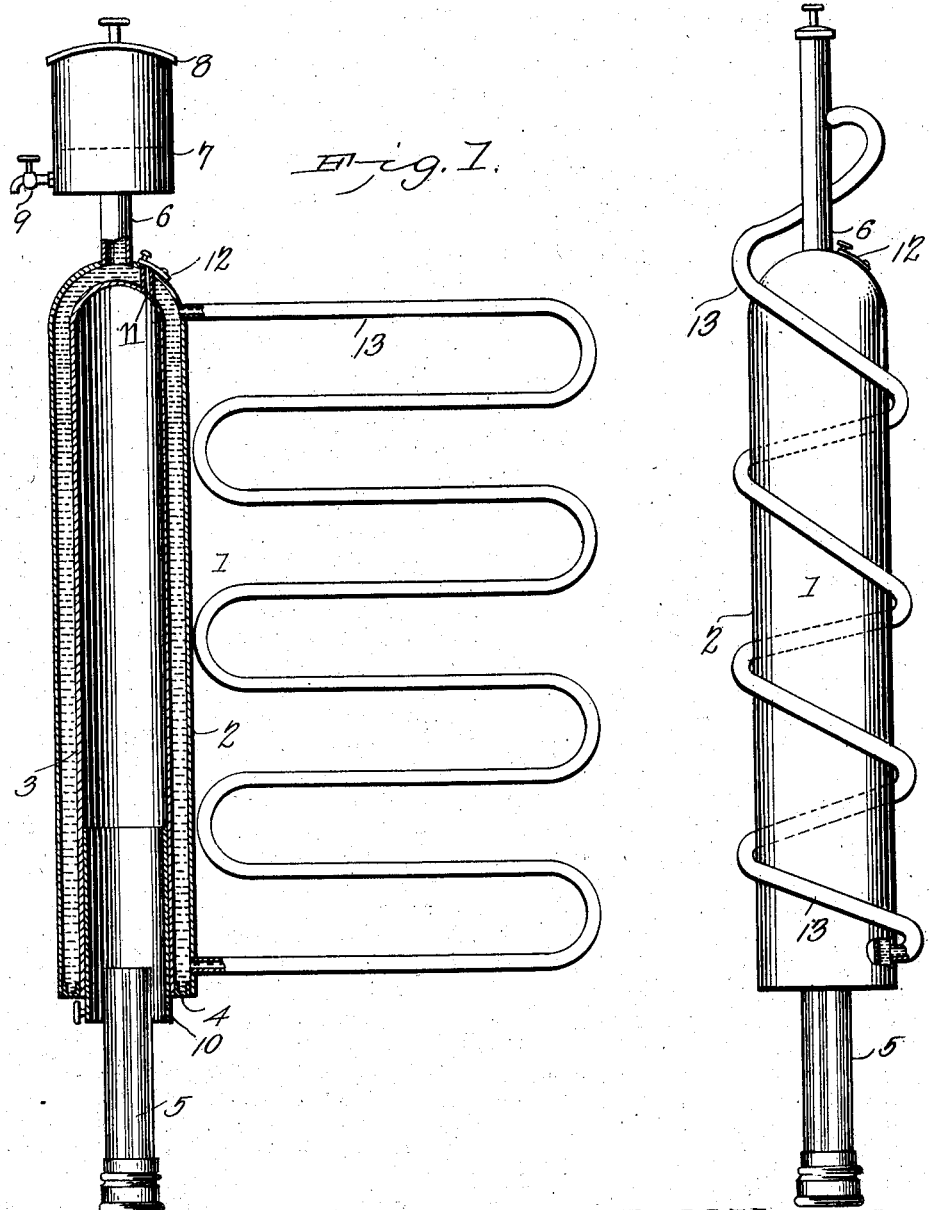
Witnesses
J. G. Hall, Inventor.
by C. A. Snow & Co.
Attorneys No. 760,689.

Patented May 24, 1904.

UNITED STATES PATENT OFFICE.

JACOB G. HALL, OF BUCKHANNON, WEST VIRGINIA.

WATER-HEATER.

SPECIFICATION forming part of Letters Patent No. 760,689, dated May 24, 1904.

Application filed January 14, 1903. Serial No. 139,037. (No model.)

*To all whom it may concern:*

Be it known that I, JACOB G. HALL, a citizen of the United States, residing at Buckhannon, in the county of Upshur and State of West Virginia, have invented a new and useful Water-Heater, of which the following is a specification.

This invention relates to certain improvements in devices of that class in which the waste heat of lamps, gas-burners, and the like is utilized for heating water.

The principal object of the invention is to provide a heater or boiler of simple and economical construction by which the heat resulting from the combustion of gas and oil may be utilized for the heating of a room or apartment.

A further object of the invention is to provide a device of this character in which provision is made for the more perfect circulation of water in order that the heat may be more readily absorbed.

With these and other objects in view the invention consists in the novel construction and arrangement of parts hereinafter described, illustrated in the accompanying drawings, and particularly pointed out in the appended claim, it being understood that various changes in the form, proportions, size, and minor details of the structure may be made without departing from the spirit or sacrificing any of the advantages of the invention.

In the accompanying drawings, Figure 1 is a sectional elevation of a water-heating device constructed in accordance with the invention. Fig. 2 is an elevation illustrating a slight modification of the invention.

In the drawings, 1 designates the main heater, which is formed of a pair of concentrically-disposed cylinders 2 and 3, between which is an annular water-space. The lower ends of the drum are connected by an annular ring 4, leaving the inner cylinder open to permit the entrance thereinto of the products of combustion from a gas-jet or lamp 5, which may be of any ordinary construction. The upper end of the outer cylinder 2 is connected by a pipe 6 with an elevated water-tank 7, having a removable lid or cover 8, which may be taken off when it is desired to replenish the supply of water, and near the lower portion of the tank is a tap 9, through which water may be withdrawn for consumption.

Fitting within the inner cylinder 3 is a small cylindrical shield 10, which may be vertically adjusted in order to surround the gas-burner or lamp, the shield being lowered in order to direct all of the products of combustion into the inner cylinder when it is desired to use the same solely for heating purposes; but when the light is to be used as well as the heat the shield is raised to the required height, and the construction is such that the apparatus may be conveniently used for heating a bedroom or the like, the gas-burner or lamp being turned on full throughout the night, while the shield will inclose the burner or lamp, so as to leave the room in darkness, or it may be adjusted vertically to a greater or less extent in order to partly light the room. The heat is concentrated in the inner cylinder 3 and is absorbed by the water, the waste and cool products of combustion escaping through an outlet-flue 11, and said flue is preferably provided with a small valve in the form of a pivotally-mounted disk 12, by which the escape may be regulated and a volume of heated gases maintained in the interior of the cylinder 3, although for practical purposes it is desirable to allow the waste gases to escape at a sufficient speed to permit the lamp or gas-jet to burn freely.

The annular water-space is connected to a coiled pipe 13, which may be led around the walls of a room for heating purposes, the top of the coil being connected to the upper end of the outer cylinder 2 and the bottom of the coil connected to the lower end of said cylinder to provide for a perfect circulation and to return the cooled water to the lowest portion of the cylinders at the point nearest the flame.

In some cases, as shown in Fig. 2, the coiled pipe may be wound in a helical form around the heater, or it may be connected to any ordinary form of radiator or the like.

Having thus described the invention, what is claimed is—

A water-heater in which gas or other lamps are employed as heating agents, said heater comprising a pair of concentrically-disposed cylinders 2 and 3 having dome-shaped upper ends and connected at their ends thereby to form a continuous annular water-space, a water-receiving vessel 7 arranged above the heater, a connecting-pipe 6 between the water-dome and said vessel, a valved escape-flue 11 leading through the walls of both cylinders, a circulating-pipe having its opposite ends connected respectively to the upper and lower portions of the water-space, an adjustable shield fitting snugly within the inner of the cylinders and held in position by frictional contact therewith, said shield being adjustable vertically to inclose a greater or less portion of the lamp-chimney and form a shade for the light, substantially as specified.

In testimony that I claim the foregoing as my own I have hereto affixed my signature in the presence of two witnesses.

JACOB G. HALL.

Witnesses:
W. D. TALBOT,
G. W. SHIPMAN.